US007857940B2

(12) United States Patent
Kim et al.

(10) Patent No.: US 7,857,940 B2
(45) Date of Patent: Dec. 28, 2010

(54) LIQUID RADIOACTIVE WASTE TREATMENT SYSTEM

(75) Inventors: Tae-Kuk Kim, Daejeon (KR); Jong-Sik Shon, Daejeon (KR); Kwong-Pye Hong, Daejeon (KR); Han-Seok Cho, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 1042 days.

(21) Appl. No.: 11/613,243

(22) Filed: Dec. 20, 2006

(65) Prior Publication Data

US 2007/0193695 A1 Aug. 23, 2007

(30) Foreign Application Priority Data

Dec. 23, 2005 (KR) ..................... 10-2005-0128437

(51) Int. Cl.
*B01D 1/14* (2006.01)
*G21F 9/08* (2006.01)

(52) U.S. Cl. .................... 159/28.6; 159/16.1; 159/43.1; 159/47.3; 159/901; 159/903; 159/DIG. 12; 159/DIG. 15; 976/DIG. 381; 588/20

(58) Field of Classification Search ................ 159/16.1, 159/28.6, 43.1, 47.3, 901, 903, DIG. 12, 159/DIG. 15; 126/569; 976/DIG. 381; 588/20
See application file for complete search history.

(56) References Cited

U.S. PATENT DOCUMENTS

| | | | | |
|---|---|---|---|---|
| 3,616,270 | A * | 10/1971 | Ferrara | 203/47 |
| 3,738,410 | A * | 6/1973 | Ricca et al. | 159/13.3 |
| 3,969,194 | A * | 7/1976 | Mende | 203/40 |
| 4,154,659 | A * | 5/1979 | Zetter | 205/786.5 |
| 4,329,205 | A * | 5/1982 | Tsumura et al. | 202/174 |
| 4,344,824 | A * | 8/1982 | Soleau, Jr. | 202/234 |
| 4,402,793 | A * | 9/1983 | Petrek et al. | 202/174 |
| 4,586,981 | A * | 5/1986 | Golubev et al. | 159/47.1 |
| 4,698,135 | A * | 10/1987 | Raab | 202/234 |
| 6,761,802 | B2 * | 7/2004 | Azimi | 202/205 |

* cited by examiner

*Primary Examiner*—Virginia Manoharan
(74) *Attorney, Agent, or Firm*—Hammer & Associates, P.C.

(57) ABSTRACT

The present invention relates to a liquid radioactive waste treatment system. The liquid radioactive waste treatment system includes a plurality of evaporation plates and each of the evaporation plates has an uneven surface, in a housing comprised of a glass. A liquid radioactive waste is dispersed via a liquid waste dispersing unit to the evaporation plate, and the liquid radioactive waste is evaporated using solar heat and airflow in the housing.

13 Claims, 6 Drawing Sheets

LIQUID RADIOACTIVE WASTE TREATMENT SYSTEM

BACKGROUND OF THE INVENTION

1. Field of the Invention

The present invention relates to a liquid radioactive waste treatment system which evaporates a liquid radioactive waste in a natural environment, and more particularly, to a liquid radioactive waste treatment system in which solar heat is used, outside air is drawn in and circulated, and a liquid waste is in contact with the outside air and evaporated.

2. Description of Related Art

Radioactive waste is divided into solid, liquid, and gaseous radioactive waste.

Not as much research on liquid radioactive waste management has been carrying out as research on radioactive solid waste management. Liquid radioactive waste is generated by nuclear power generation or radioactive isotope use. The generated liquid waste is required to be safely processed and managed to prevent the waste from harming humans. Also, an evaporation process is required for volume reduction.

As an amount of liquid waste increases, a need for processing accumulated liquid waste increases. Also, a liquid radioactive waste treatment standard is compounded due to an increase in industrial waste water. The transportation and processing of the liquid waste is more difficult than with solid waste.

As one of the methods of managing liquid radioactive waste, a method which evaporates and concentrates liquid radioactive waste by mainly using steam, or processes liquid radioactive waste using an ion exchange resin has been proposed. However, an energy consumption efficiency and process efficiency of such method are low, which is uneconomical. Accordingly, a system which has a high energy consumption efficiency and process efficiency is required.

Also, the other method of managing liquid radioactive waste which flows liquid radioactive waste and absorbs liquids of liquid waste by using an evaporation fabric has been proposed. However, the evaporation fabric using fabrics is exposed to direct sunlight, and thus an evaporation fabric life is shortened, and a great amount of solid waste may be generated. When the evaporation fabric is vertically installed, a period of time for contacting the liquid waste with air is short, and thereby causing a low evaporation efficiency. Also, liquid waste may not be evenly absorbed in the evaporation fabric, and a channeling phenomenon may occur and thus, evaporation surface area may be reduced.

BRIEF SUMMARY

The present invention provides a liquid radioactive waste treatment system which uses solar heat, and thereby improving an energy consumption efficiency and performance efficiency.

The present invention also provides a liquid radioactive waste treatment system which may process a great amount of liquid radioactive waste, be advantageous for maintenance and repair, and be semi-permanently used, with a simple and small-sized structure.

The present invention also provides a liquid radioactive waste treatment system which increases a period of time for liquid to contact with air and solar heat, and thereby may improve an evaporation efficiency and rapidly process a great amount of liquid radioactive waste.

The present invention also provides a liquid radioactive waste treatment system which may prevent a channeling phenomenon.

According to an aspect of the present invention, there is provided a liquid radioactive waste treatment system includes a housing, an evaporation unit, and a liquid waste dispersing unit.

In this instance, the housing comprises an external wall, the wall being able to be penetrated by sunlight and being comprised of a transparent material. The evaporation unit comprises an evaporation plate having an uneven surface on which the liquid waste flows. The liquid waste dispersing unit is located above the evaporation plate and disperses the liquid waste.

Also, a plurality of evaporation plates is provided, and each of the evaporation plates is stacked to be spaced apart from each other by a predetermined distance. Also, a guide plate is perpendicularly attached to the evaporation plate at each side of the evaporation plate in order to prevent the liquid waste from leaking. The evaporation plate is positioned to be inclined at a predetermined angle, and a lower end of the evaporation plate is formed to be inclined into a single direction, to enable the liquid waste flow in the direction. The evaporation plate is preferably made of a stainless steel.

Also, an inlet fan and an exhaust fan are mounted on the external wall of the housing. Air which is flowed inside of the housing from the inlet fan, passes over the evaporation plate, and is discharged to an outside of the housing via the exhaust fan after monitoring system. Such airflow improves an evaporation efficiency.

A heat collector plate may be further mounted on an upper wall of the housing and stores solar heat. The liquid waste which passes the evaporation plate may move to the heat collector plate, be heated, and move to the evaporation plate again to circulate.

Also, according to another aspect of the present invention, there is provided a liquid radioactive waste treatment system, the system including: a housing which is covered with a glass; an evaporation module where an evaporation plate, having an uneven surface in the housing, and a guide plate, which is perpendicularly attached to the evaporation plate at each side of the evaporation plate, are stacked, and each of the evaporation plates are spaced apart from each other by a predetermined distance; and a liquid waste dispersing unit, which comprises a plurality of evaporation modules, is located above the plurality of evaporation modules, and disperses the liquid waste.

The liquid radioactive waste treatment system has a high energy consumption efficiency and may be semi-permanently used by using solar heat. Also, in the liquid radioactive waste treatment system, a period of time for contacting with the solar heat and air increases, and thereby may have a high evaporation efficiency, and may rapidly process a great amount of liquid waste. Also, a channeling phenomenon may be prevented.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
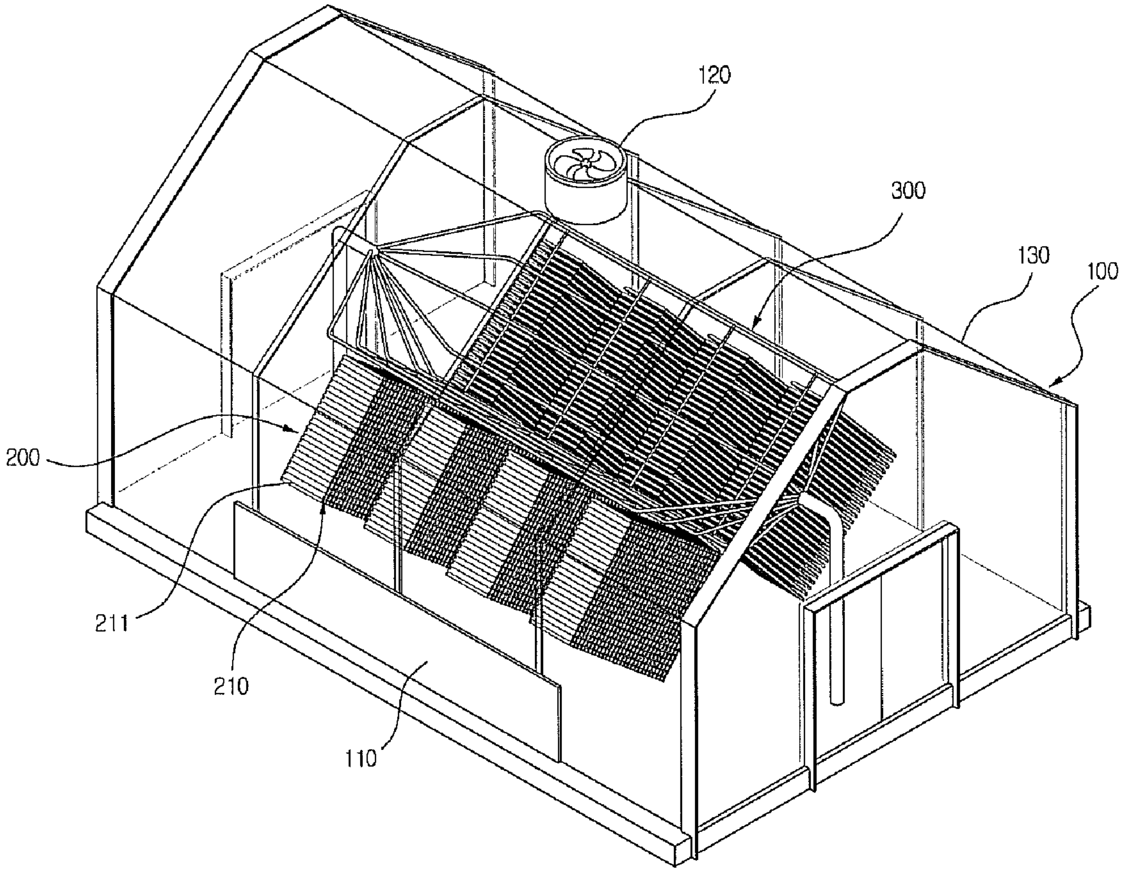
FIG. 1 is a perspective view illustrating a liquid radioactive waste treatment system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
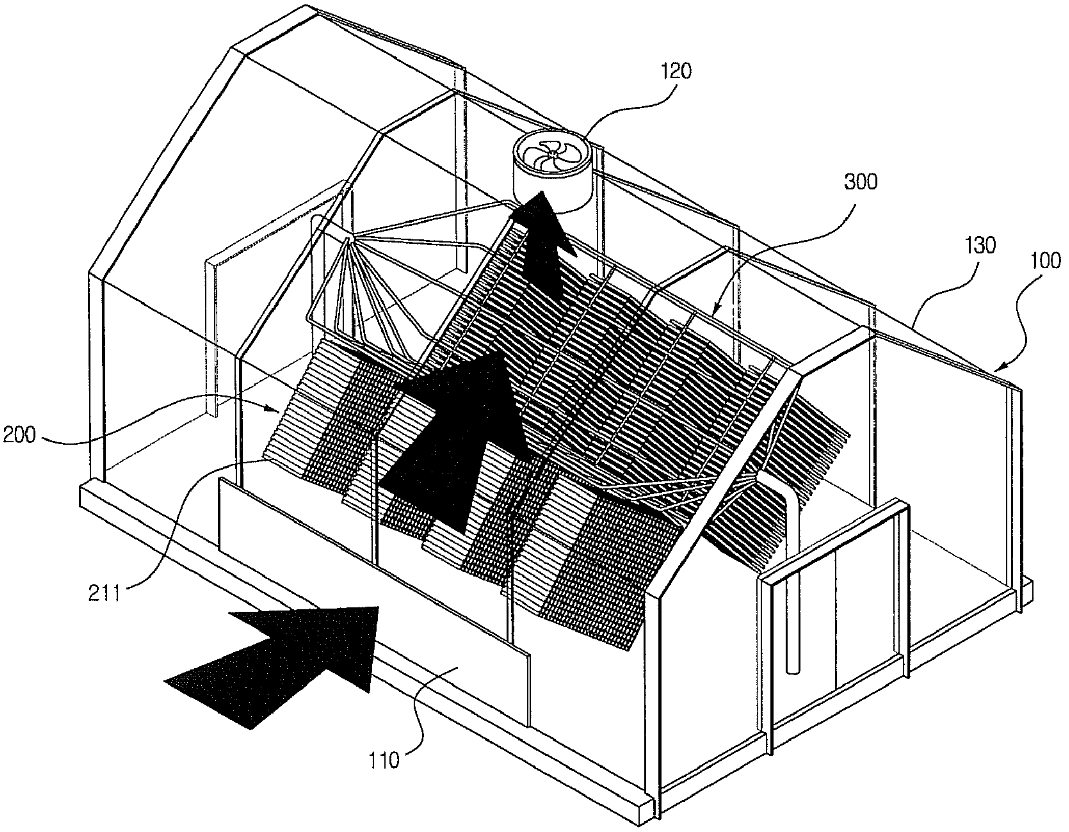
FIG. 2 is a perspective view illustrating a flow of air.
Figure 3:
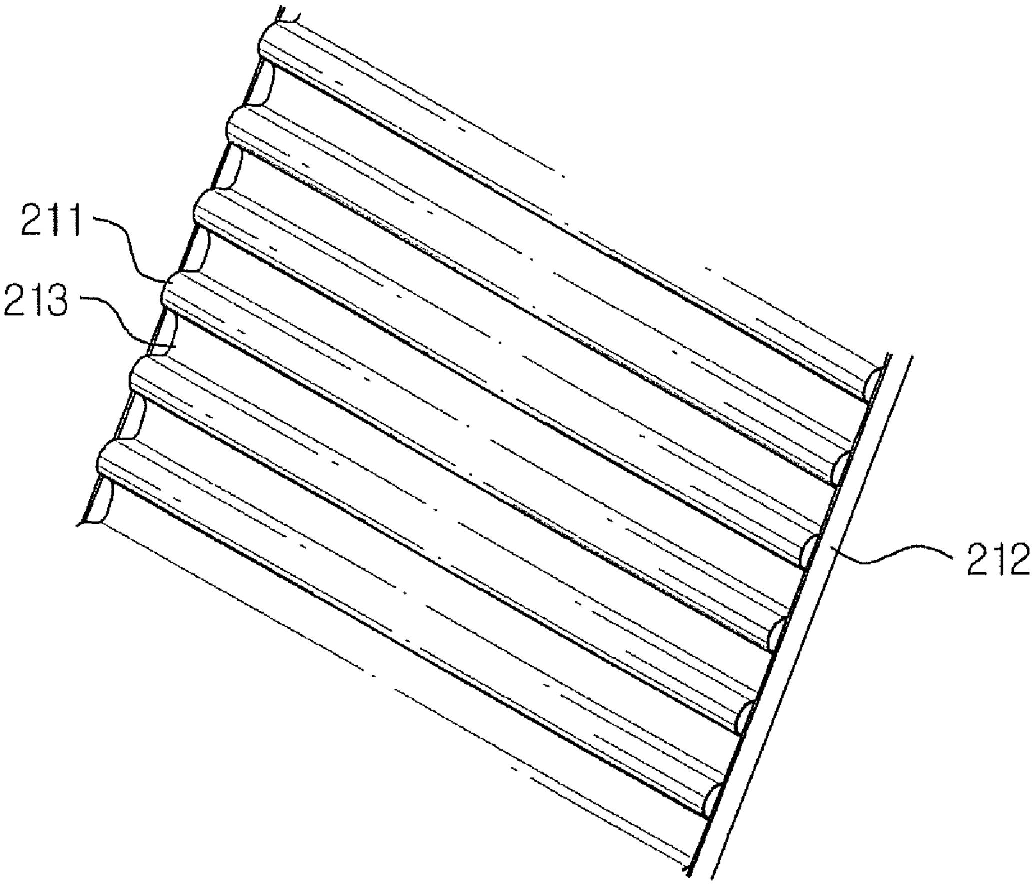
FIG. 3 is a perspective view illustrating an evaporation plate.

FIG. 1 is a perspective view illustrating a liquid radioactive waste treatment system according to an embodiment of the present invention. FIG. 2 is a perspective view illustrating a flow of air. FIG. 3 is a perspective view illustrating an evaporation plate.

As illustrated in FIGS. 1, 2 and 3, the liquid radioactive waste treatment system according to an embodiment of the present invention includes a housing 100, an evaporation unit 200, and a liquid waste dispersing unit 300. The housing 100 includes an external wall 130, and an interior space for the evaporation unit 200 and the liquid waste dispersing unit 300. The external wall 130 of the housing 100 may be penetrated by sunlight and made of a glass. However, the external wall 130 may not be limited to glass. A frame, which is not illustrated is formed in the housing 100. Also, a glass, and the like may be installed between the frames.

An inlet fan 110 is mounted on a side of the housing 100 in order to draw air into the housing 100. An exhaust fan 120 is mounted on upper wall of the housing 100 in order to discharge the air which is in the housing 100. The air which is drawn from the inlet fan 110 passes an evaporation plate 211, and then is discharged to an outside of the housing 100 via the exhaust fan 120. When a portion of a side of the housing 100 is open, a liquid waste may be evaporated on the evaporation plate 211 through natural convection. However, forced convection may be performed by installing the inlet fan 110 and the exhaust fan 120 according to an embodiment of the present invention may improve an evaporation efficiency. However, it is preferable that natural convection and forced convection are combined to provide even greater improvement of the evaporation efficiency, which is described in detail with reference to FIG. 2.

The evaporation unit 200 includes an evaporation module 210 including the evaporation plate 211. Four evaporation modules 210 are provided on each side, right and left, and thus, eight evaporation modules 210 are provided in total. Each of the evaporation modules 210 includes a plurality of evaporation plates 211, and the each of the evaporation plates 211 is stacked to be spaced apart from each other by a predetermined distance. Also, the evaporation plates 211 have an uneven surface, i.e. the evaporation plate 211 is corrugated. Specifically, the evaporation plate 211 is a medium for evaporation which plays an essential role in the evaporation, and increases a distance where the liquid waste flows, due to the uneven surface. Also, the evaporation plate 211 increases the period of time for contacting the liquid waste with the evaporation plate 211 due to the uneven surface. As an example, each of the evaporation modules 210 may be comprised of twenty five evaporation plates 211, and each of the twenty five evaporation plates 211 may be spaced apart from each other by 5 cm. Also, when four evaporation modules 210 are provided at each side, right and left, two hundred evaporation plates 211 may be provided in total. The evaporation plate 211 is positioned to be inclined at a predetermined angle so that the liquid waste may smoothly flow.

The evaporation plate 211 may be made of a stainless steel (SUS). The stainless steel refers to a corrosion resistant steel which has a higher corrosion resistance than a iron.

The uneven surface of the evaporation plate 211 is illustrated in FIG. 3. As illustrated, the evaporation plate 211 is perpendicularly corrugated. A guide plate 212, which has a predetermined height, is perpendicularly attached to the evaporation plate 211 at each side of the evaporation plate 211. Also, a connection bar 213, which is horizontally extended, is attached between each of the guide plates 212.

The evaporation plate 211 is provided between two of the guide plates 212, and protruded from the plurality of connection bars 213. The evaporation plate 211 is integrally formed to be located under the connection bar 213, at a portion where the connection bar 213 is formed, and the evaporation plate 211 and the connection bar 213 are integrally formed. The guide plate 212 is combined with the evaporation plate 211 by welding. The guide plate 212 prevents the liquid waste from leaking into a left or right direction, and supports the evaporation plate 211. In order to improve the evaporation efficiency, the liquid waste is required to stay on the evaporation plate 211 for a longer period of time. For this, forty three evaporation plates 211 may be provided for each evaporation module 210, and inclined by about 45°. Also, a protrusion height of the stainless steel corrugation may be about 30 mm. In this instance, the stainless steel is about 1 m×4 m, and a thickness of the stainless steel is about 0.5 mm. Also, the guide plate 212 may be formed to have a length of about 2.5 m and a height of about 50 mm.

Figure 4:
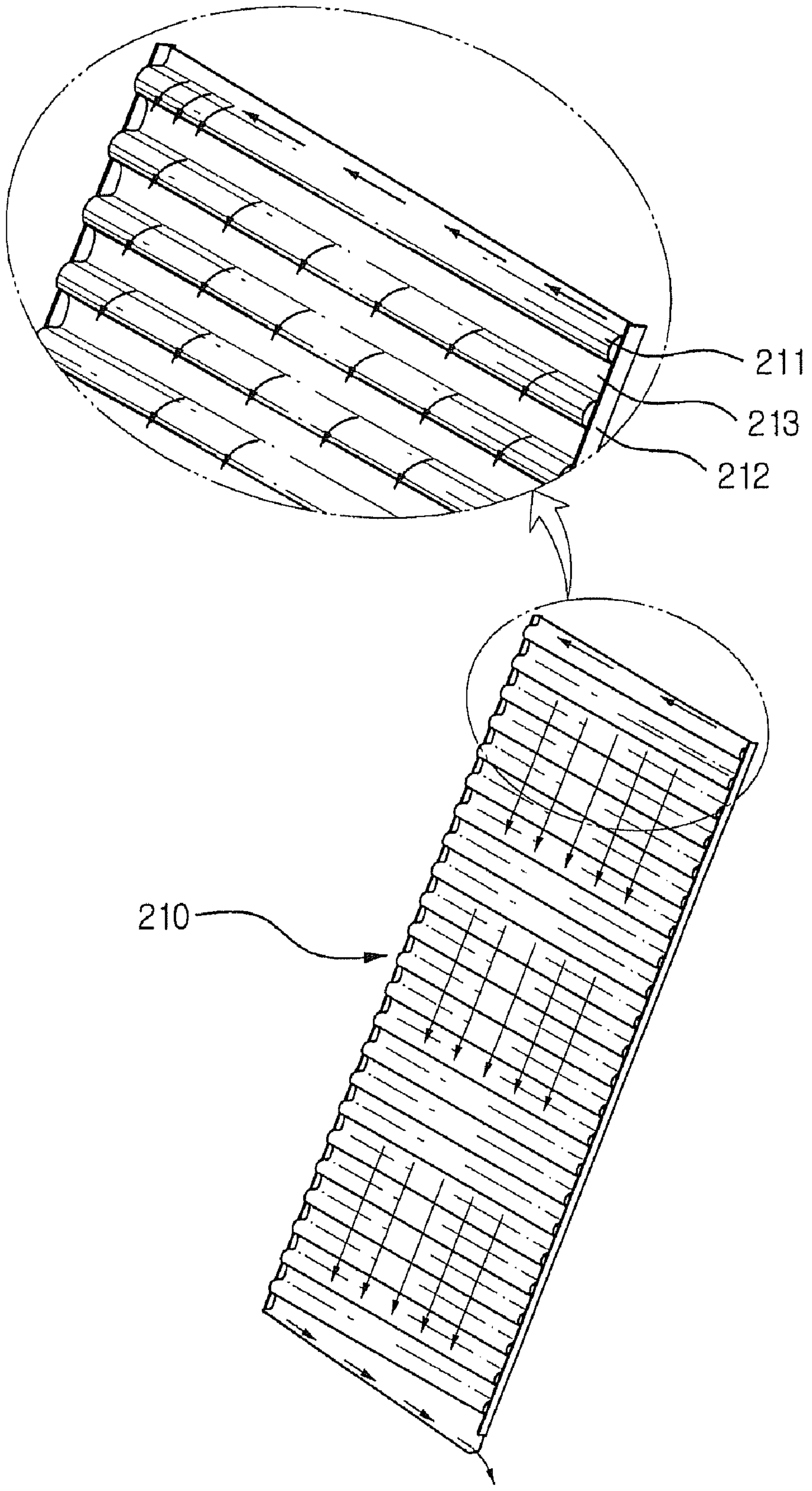
FIG. 4 is a front view illustrating a flow of liquid waste on an evaporation plate.

FIG. 4 is a front view illustrating a flow of liquid waste on an evaporation plate.

As illustrated in FIG. 4, the liquid waste regularly flows down to a subsequent space on the evaporation plate 211, after filling a higher space on the evaporation plate 211. Accordingly, a channeling phenomenon may be prevented, i.e. the liquid waste flows in a single direction. Also, a lower end of the evaporation plate 211 is formed to be inclined into a single direction, to enable the liquid waste to flow in the same direction. The liquid waste which is discharged at the lower end of the evaporation plate 211 may be collected in a separate vessel.

Figure 5:
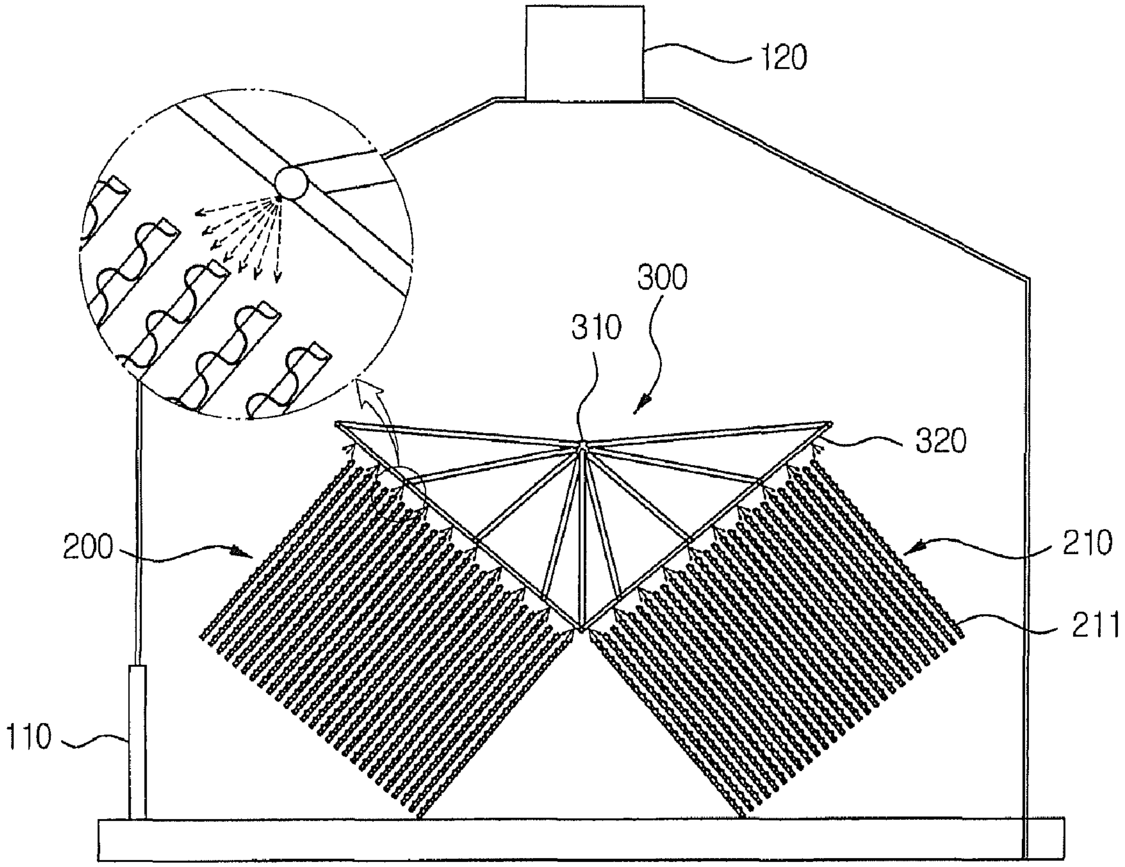
FIG. 5 is a side view illustrating a liquid waste dispersing unit.

FIG. 5 is a side view illustrating a liquid waste dispersing unit.

As illustrated in FIG. 5, the liquid waste dispersing unit 300 branches off from a main pipe 310 to a branch pipe 320. The branch pipe 320 carries the liquid waste to an upper end of an evaporation plate 211. When dispersing the liquid waste, the liquid waste flows on the evaporation plate 211, and evaporation begins. An operation of evaporation on the evaporation plate 211 has been described above.

Figure 6:
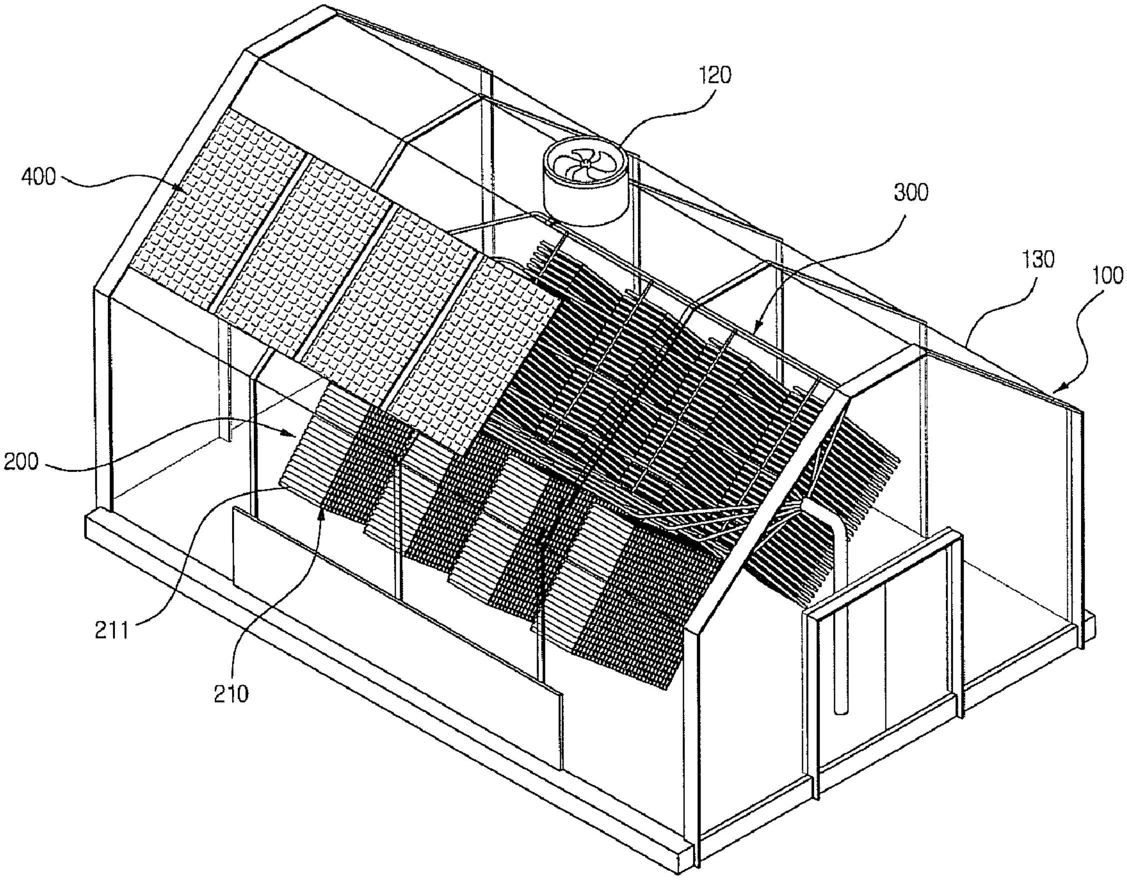
FIG. 6 is a perspective view illustrating a liquid radioactive waste treatment system according to another embodiment of the present invention.

FIG. 6 is a perspective view illustrating a liquid radioactive waste treatment system according to another embodiment of the present invention.

As illustrated in FIG. 6, a heat collector plate 400 is mounted on an upper wall of the housing 100. The heat collector plate 400 may store the solar heat, and stored solar heat may raise an internal temperature of the housing 100. Also, the stored solar heat may raise a temperature of liquid waste through the evaporation plate 211 or the liquid waste dispersing unit 300 since the stored solar heat may be contacted with the evaporation plate 211 or the liquid waste dispersing unit 300. The liquid waste which passes the evaporation plate 211 is collected in a separate vessel, moves to the heat collector plate 400 via a separate tube which is not illustrated, and is heated in the heat collector plate 400. The heated liquid waste in the separate tube raises the internal temperature of the housing 100, which is similar in principle to a boiler.

When the temperature of liquid waste is raised by 1° C., an evaporation loss increases by 0.02 l per unit area (m2) per one hour. Thus, according to experimental results, when forming a heat collector plate 400 with an area of about 3200 $m^2$ in total, the evaporation loss increases by about 64 l per hour. Also, when water with a temperature of about 20° C. is heated to a temperature of about 50° C., i.e. a temperature increase of about 30° C., the evaporation loss increases by about 1900 l per hour.

Also, a comparison experiment with a conventional evaporation fabric is described. When a liquid waste is evaporated by using the conventional evaporation fabric, at an airflow rate of about 2 m/sec between the evaporation fabrics, the liquid waste is evaporated at a rate of about 1.25 $l/hr \cdot m^2$. However, when using a corrugated evaporation plate, the liquid waste is evaporated at a rate of about 2.0 $l/hr \cdot m^2$. Accordingly, when the corrugated evaporation plate is used, the evaporation loss increases by about 1.5 times. Thus, when considering a total operational cost including a treatment cost for 15 years, about a billion Korean won is saved. The present invention may not be limited to a liquid radioactive waste treatment, and may be applied to a general industrial liquid waste treatment.

According to the present invention, a liquid radioactive waste treatment system uses solar heat, and thereby may improve an energy consumption efficiency and manufacturing efficiency.

Also, according to the present invention, a liquid radioactive waste treatment system may process a great amount of liquid radioactive waste, be advantageous for maintenance and repair, and be semi-permanently used, with a simple and small-sized structure.

Also, according to the present invention, a liquid radioactive waste treatment system increases a period of time for contacting with air and solar heat, and thereby may improve an evaporation efficiency and rapidly process a great amount of liquid radioactive waste.

Also, according to the present invention, a liquid radioactive waste treatment system may prevent a channeling phenomenon.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A liquid radioactive waste treatment system, the system comprising:

a housing which comprises an external wall, the wall being able to be penetrated by sunlight and being comprised of a transparent material;

an evaporation unit which is located in the housing, and comprises an evaporation plate having an uneven surface on which the liquid waste flows; and a liquid waste dispersing unit which is located above the evaporation plate and disperses the liquid waste; and a heat collector plate which is mounted on an upper wall of the housing and stores solar heat, wherein the liquid waste which passes the evaporation plate moves to the heat collector plate, is heated, and moves to the evaporation plate again to circulate.

2. The system of claim 1, wherein a plurality of evaporation plates are provided, and each of the evaporation plates are stacked to be spaced apart from each other by an equal distance.

3. The system of claim 1, wherein a guide plate is perpendicularly attached to the evaporation plate at each side of the evaporation plate.

4. The system of claim 1, wherein a lower end of the evaporation plate is formed to be inclined into a single direction, to enable the liquid waste flow in the direction.

5. The system of claim 1, wherein the evaporation plate is positioned to be inclined at a predetermined angle.

6. The system of claim 1, wherein the evaporation plate is made of a stainless steel.

7. The system of claim 1, further comprising:

an inlet fan and an exhaust fan which are mounted on the external wall of the housing, wherein air which is flowed inside of the housing from the inlet fan, passes over the evaporation plate, and is discharged to an outside of the housing via the exhaust fan.

8. The system of claim 1, wherein the external wall of the housing is made of a glass.

9. A liquid radioactive waste treatment system, the system comprising:

a housing which is covered with a glass;

an evaporation module where an evaporation plate, having an uneven surface in the housing, and a guide plate, which is perpendicularly attached to the evaporation plate at each side of the evaporation plate, are stacked, and each of the evaporation plates are spaced apart from each other by an equal distance;

a liquid waste dispersing unit, is located above the plurality of evaporation modules, and disperses the liquid waste; and a heat collector plate which is mounted on a upper wall of the housing and stores solar heat, wherein the liquid waste which passes the evaporation plate moves to the heat collector plate, is heated, and moves to the evaporation plate again to circulate.

10. The system of claim 9, wherein a lower end of the evaporation plate is formed to be inclined into a direction, to enable the liquid waste flow in the direction.

11. The system of claim 9, wherein the evaporation plate is positioned to be inclined at a predetermined angle.

12. The system of claim 9, wherein the evaporation plate is made of a stainless steel.

13. The system of claim 9, further comprising:

an inlet fan and an exhaust fan, which are mounted on the external wall of the housing, wherein air which is flowed inside of the housing from the inlet fan passes over the evaporation plate, and is discharged to outside of the housing via the exhaust fan after monitoring system.

* * * * *